United States Patent Office 3,485,716
Patented Dec. 23, 1969

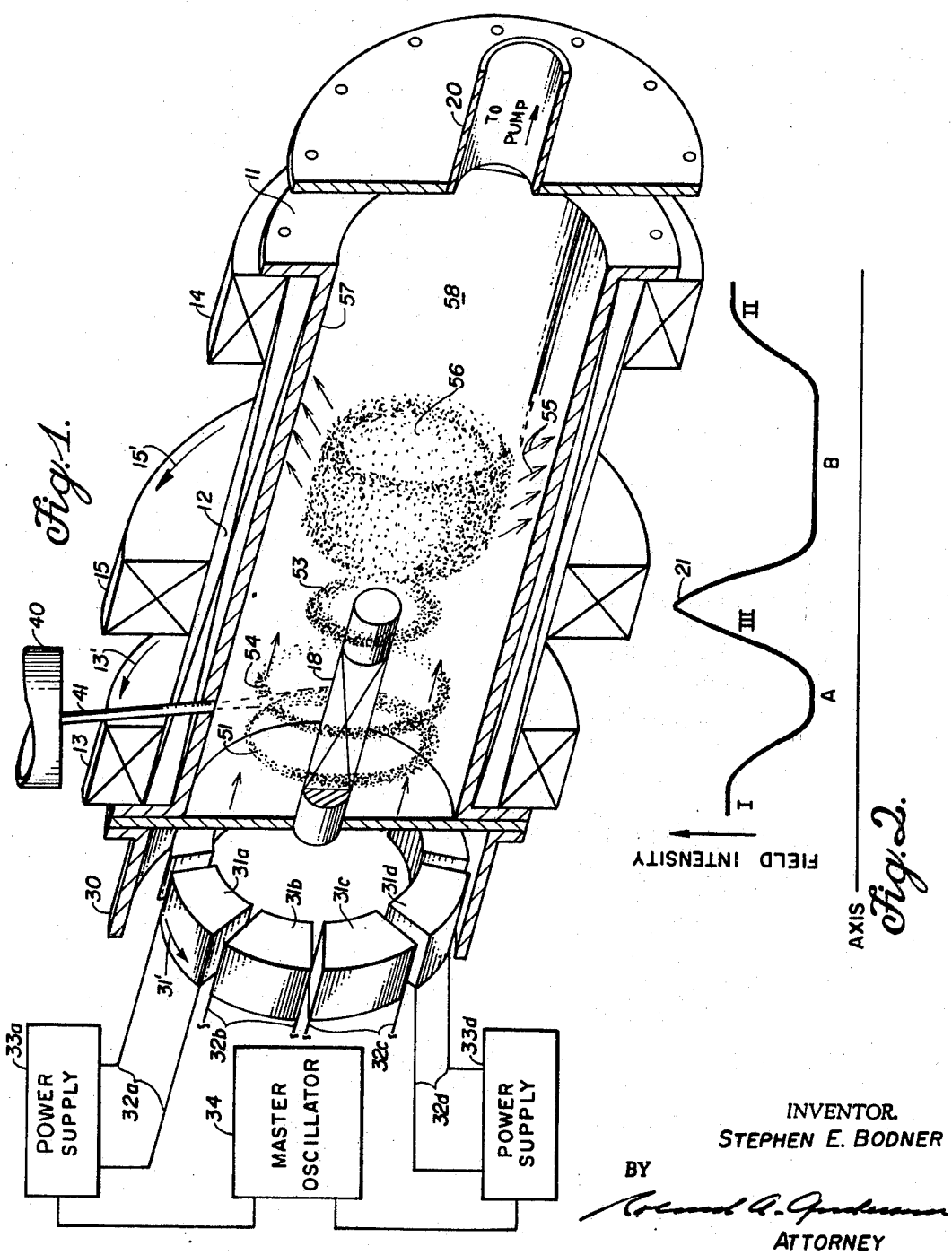

3,485,716
METHOD AND APPARATUS FOR INJECTING AND TRAPPING CHARGED PARTICLES IN A MAGNETIC FIELD
Stephen E. Bodner, Berkeley, Calif., assignor to the United States of America as represented by the United States Atomic Energy Commission
Filed Nov. 1, 1967, Ser. No. 679,826
Int. Cl. G21b 1/00; H01j 23/00, 7/00
U.S. Cl. 176—4          8 Claims

ABSTRACT OF THE DISCLOSURE

Injection of charged particles into a magnetic containment zone by creating charged particle ring bunches in a first magnetically defined zone and transferring the particle bunches into a second magnetically defined zone containing a dispersed dielectric material which interacts with the injected particles to extract energy therefrom by a Cerenkov radiative mechanism so that the energetic particles are trapped in the second zone.

BACKGROUND OF THE INVENTION

This invention pertains to magnetic trapping of charged particles, and more particularly to a method and apparatus for injecting and trapping charged particles in a closed magnetic field region or containment zone.

PRIOR ART

The injecting and trapping of charged particles in a magnetic containment field is an operation of significant importance in the field of thermonuclear reactors. Over the years, a wide variety of families of magnetic confinement devices utilizing static and dynamically varied magnetic fields, or a combination of both, to define containment zones have been developed. In such devices employing static magnetic confinement fields, injection and trapping of the charged particles is a difficult problem since particles directed to enter the field tend to leave very rapidly unless an adequate trapping procedure is employed. Thermonuclear reactions can occur only when the charged particles in adequate densities and temperatures are confined in the magnetic field containment zone for a sufficiently long time.

In cylindrical magnetic confinement devices, e.g., magnetic mirror type containment fields having a uniform central magnetic field intensity and end regions of increased intensity, particle energy can be thought of as having two components: a translational component and a rotational component. The translational component, if too large relative to the rotational component, can cause a particle to escape through the loss cone of the magnetic mirror regions of the cylindrical device, e.g., by exit through the injection region from which it entered. To this end, many investigators have heretofore proposed various schemes for reducing the translational component or converting it to a rotational form. A particularly difficult problem is presented in connection with the injection and trapping of highly energetic particles, such as relativistic electrons in an "Astron" type device in which it is desired to provide a cylindrical rotating layer (E-layer) of high energy of relativistic electrons in a magnetic mirror type containment field.

Astron type thermonuclear reactors are described in U.S. Patent No. 3,071,525 dated Jan. 1, 1953, to N. C. Christofilos for "Method and Apparatus for Producing Thermonuclear Reactions." Another description of the "Astron" appears in Chapter 10, "Controlled Thermonuclear Reactions" by Glasstone and Lovberg, Van Nostrand, 1960.

SUMMARY OF THE INVENTION

An object of my invention is to inject charged particles into a cylindrical magnetic confinement field, and having injected them, remove at least a portion of the translational energy component of the particles during transit of the field, thereby trapping them in a containment zone. This object is achieved by irreversibly moving an annular current loop or bunch of electrons injected into and formed in a first magnetically defined zone to a second zone, to be trapped and retained therein. The electron current loop is moved between zones by a magnetic repulsion force generated by a pulsed current conductor outside the zones. Within the second trapping zone for the charged particles, a dielectric gas is provided for interaction with the particles. Radiative encounter between the dielectric gas and the particles results in energy loss for the particles so that they no longer have the translational energy necessary to leave the trapping zone. The irreversible motion of the electron bunches from the first zone to the second can be repeated at frequencies up to 300 mc. (megacycles) resulting in a rapid increase in density of the energetic charged particles trapped in the second, i.e., containment zone.

DESCRIPTION OF THE DRAWINGS

FIGURE 1 is a perspective view of a preferred embodiment of the invention.

FIGURE 2 is a view of the axially symmetric magnetic field intensity profile associated with corresponding portions of the apparatus of FIGURE 1 in regions indicated by the dashed lines.

DESCRIPTION OF THE PREFERRED EMBODIMENT

A preferred embodiment of the invention is described with reference to FIGURE 1, with illustrative reference to injection of electrons to form an E-layer in an Astron type thermonuclear reactor. Note that positive particles such as protons, deuterons, tritons, etc., may also be injected and trapped using the principles taught herein. Moreover, any type of charged particles or mixture of charged particles of the same electric charge sign are suitable for injection and trapping as mentioned below.

The apparatus of FIGURE 1 includes an elongated cylindrical tank 11 made of material pervious to a steady magnetic field, but conductive so as to provide for shielding and exclusion of a rapidly varying field (e.g., conductive metal) and arranged to be evacuated with vacuum pumps (not shown) connected through pipes 20 to provide a particle concentration preferably with an initial concentration of about $10^{16}$ particles per cubic centimeter of gas therein. For purposes of the invention, particle densities considerably below this value, i.e., down to $10^{14}$ particles per cubic centimeter, may also be employed, provided that adequate ionization to provide an initial plasma density of at least about $10^9$ particles per cubic centimeter can be obtained. Magnetic mirror coils 13 and 14 disposed concentrically about the opposite ends of cylindrical tank 11 provide magnetic mirror terminal closure field regions therein. Coils 13 and 14 are approximately equal in ampere turns relation, and provide similar magnetic field configurations and intensities indicated by regions I and II in FIGURE 2. A coil 15 is coaxially disposed about tank 11 between coils 13 and 14, but preferably closer to coil 13 to provide a third magnetic mirror field region of intensity preferably about 40% greater than that of coil 13 indicated by region III in FIGURE 2. The coils 13, 14 and 15 are connected to and energized by power supplies (not shown). Another magnetic field coil 12 extends coaxially along the length of cylindrical tank 11 within coils 13, 14 and 15 to provide a lower intensity field region A, indicated in FIGURE 2, between coils 13 and 15 and a uniform magnetic field B, indicated in FIGURE 2, centrally in the region between coils 14 and 15. Accordingly, the magnetic mirror field region of coils 13 and 15 and coils 15 and 14, respectively superimposed on the uniform field provided by coil 12, define respectively therebetween first and second axially spaced magnetic confinement zones for charged particles within vacuum tank 11, with an intensity distribution as shown in FIGURE 2 of the drawing. A cantilever coil 18 extends axially within cylindrical take 11 from the end closest to coil 13 to a region just short of the projection of coil 15. The function of this cantilever coil is to shape charged particle accumulations entering the first confinement zone into a current loop or annular rotating cylindrical charged particle bunch. This cantilever coil is generally of the type disclosed in U.S. Patent No. 3,036,963, entitled "Method and Apparatus for Injecting Electrons in a Magnetic Field," issued May 22, 1962, to N. C. Christofilos.

For purposes of the invention, a coil 31 is disposed adjacent to coil 13, but has a smaller radius so that it will fit within the end section 30 of the cylindrical tank 11 coaxially outward from coil 13. The coil is preferably comprised of circumferentially spaced segments 31 (a, b, c, et seq.) incorporated into a series of identical circuits 32, a, b, c, et seq., respectively). Compositely, segments 31a, 31b, et seq., make up the coil 31 which, being segmented, provides for lower effective inductance and an extremely rapid rise time magnetic field generating arrangement required for purposes of the invention.

Power supplies 33 are connected to circuits 32 (a, b, c, et seq.) to provide high energy current pulses. Each power supply, 33a, etc., is arranged to deliver a pulse of electrical current to its respective circuit at a selected time. Preferably, all circuits are pulsed so that currents appear in each of the segments 31 substantially simultaneously. A master oscillator or pulse generator 34 may provide a common reference signal to power supplies 33, in accord with conventional procedures, to provide for such simultaneous energization.

An electron accelerator or electron gun 40 is disposed, e.g., with the electron beam guide tube 41 entering tank 11 in the region between coils 13 and 15 to direct a beam of electrons tangentially therein and inclined toward central portions of tank 11, at a small angle (e.g., about 1°) to a plane perpendicular to the axis of the magnetic field in tank 11. Accelerator 40 may be of the type described in the article "High Current Linear Induction Accelerator for Electrons" by N. C. Christofilos et al., appearing in the Review of Scientific Instruments, vol. 35, No. 7, pp. 886–890, July 1964, or that of the aforementioned U.S. Patent No. 3,036,963. In typical operation electron accelerator 40 directs a high energy electron beam 51, e.g., above 1 mev., into the region between magnetic coils 13 and 15, providing an electron bunch of equivalent rotational energy component, and with a small translational component in said region. Electron rotational energies above 1 mev. can be used, e.g., a 4 mev. electron beam has been used in practical Astron operations. However, electron beams of even higher rotational energy can be used in accordance with the invention. Due to the configuration of the magnetic field between said coils 13 and 15, electron beam 51 takes the shape of a closed current loop or ring coaxially between coils 13 and 15. The general field shape between coils 13 and 15, as shown in FIGURE 2 with the field of coil 15, is generally equivalent or slightly stronger than the field of coil 13. The formation of a closed loop may be accomplished in a time as short as about 3 nanoseconds, which characteristic may be used to advantage in certain operations; however, ring formation can be of any selected time period of longer duration as required in particular operations. After the electron current loop or ring bunch is formed, segments 31 are pulsed by actuating their respective power supplies. Current in segments 31 (a, b, c, et seq.) flows in the same direction as in coils 13 and 15 as indicated by the arrows 13', 15' and 31'. The magnetic field induced by unidirectional currents in segments 31 opposes the magnetic field in electron beam current loop 51, which then flows in a direction contra to that in segments. The magnitude of the current in segments 31 is made sufficient to produce a pulsed magnetic field effective to repel electron beam loop 51 through the restraining field of coil 15, indicated by the magnetic "hill" 21 in FIGURE 2. The pulsed magnetic field must generally exceed, at least slightly, the peak field intensity of "hill" 21 produced by coil 15 to obtain this result. The field from the segments 31 will not be significantly absorbed in coil 13, but tends to be focussed or concentrated down the length of the cylinder toward electron current loop 51.

As mentioned previously, the vacuum applied to cylindrical tank 11 provides, at least initially, a particle density, e.g., residual hydrogen molecules or hydrogen isotope molecules, of approximately $10^{16}$ particles per cubic centimeter. It is preferred that these particles be excited such as by X-rays or by microwaves (by means not shown) to provide an initial density of above about $10^9$ ionized particles per cubic centimeter. However, this operation can be omitted since the gas between coils 15 and 14 in cylindrical tank 11 will in any event be ionized by passage of the electron beam loops 54 and 53 therethrough. The ionized gas thus provided characteristically has a dielectric constant greater than one. This dielectric effect provides the irreversible trapping mechanism of this invention in the following manner.

Beam loops 53 are directed past coil 15 by repeated pulses to segments 31 after establishment of successive beam loops 51. Electron beam loops 54 and 53, which are pulsed past coil 15, enter a central dielectric region 58 with a translational component of velocity in the axial direction which is greater than the sped of electromagnetic waves in the medium. Under these conditions, the electrons in the medium loops 54 and 53 entering the central field region 58 interact with the dielectric gas material of region 58 to emit coherent radiation by the so-called Cerenkov effect, which radiation impinges on the walls of cylindrical tank 11. The Cerenkov radiation is absorbed thereon by a resistive coating 57. Radiation, i.e., electromagnetic radiation in visible or other light spectrum range indicated by arrows 55 from electrons in dielectric zone 56, is coherent, characteristic of the Cerenkov effect. Where radiation is coherent, the power lost per particle is proportional to the current in the electron current loop. This feature vastly increases the energy loss from the electrons, effectively reducing the translational velocity of the electron ring and thereby greatly increasing the effectiveness of electron trapping in central field region 58, providing containment therein as a rotating cylinder of electrons.

To accomplish transport of the electron loop 51 into the dielectric containment region 58, it must be provided with high enough of a translational velocity in the first trapping zone between coils 13 and 15. An appropriate translational velocity is approximately 0.01 of the velocity of light where the residual background ionized particle, i.e., plasma density in the central magnetic confinement zone between mirrors 13 and 14 is about $10^9$ ionized particles per cubic centimeter. This requires a composite pulsing current in the segmented coil 31 of about 40 amps, with a rise time in the range of a few nanoseconds for the example given below.

Electron beam loops are injected into the region between coils 14 and 15, one after another, as rapidly as the loops are generated by the accelerator 40. Electron density increases in the central containment zone until electrons are lost as fast as they are transported therein, i.e., until equilibrium is reached. A cylindrical sheath of electrons 56 is thereby formed. This sheath may be the so-called E-layer described in the aforementioned patent. As the density of the E-layer builds up, the magnetic field may be increased proportionately as in the aforesaid patent. The following example will provide specific operating parameters of the electron injection procedure of the invention when adapted to an Astron reactor.

| | |
|---|---|
| Electron energy in zone 51 (rotational injection) _____ mev__ | 4 |
| Electron energy in zone 51 (transverse injection) _____ kev__ | 250 |
| Electron current _____ amps__ | 100 |
| Electron loop radius _____ cm__ | 30 |
| Loop velocity after pulsing (speed of light in vacuum) _____ c__ | 0.01 |
| Background charged particle density ionized particles/cc__ | $10^9$ |
| Current in coil 12 _____ amps__ | 40–50 |
| Field strength of coils 13 and 14 (approx.) gauss__ | 500 |
| Field strength of coil 15 (approx.) _____ do____ | 700 |
| Radius of cylinder 11 _____ cm__ | 100 |
| Length of containment zone _____ cm__ | 100 |

In the form hereinbefore described, the teachings of the invention are applied for the purpose of injecting high energy relativistic electrons to form a rotating cylindrical sheath or E-layer of electrons in an axially symmetric magnetic field having a uniform intensity magnetic field region disposed between terminal intensified magnetic mirror field regions. It will be noted that as the E-layer builds up, the magnetic field thereof interacts with the aforesaid axially symmetric magnetic field to form a containment zone surrounded by a system of closed magnetic field lines providing a containment zone in which positively charged ions produced by interaction of the injected electrons and gas in said tank, together with other electrons, are trapped, producing a high temperature plasma or gas. For use as a thermonuclear reactor, the gas in said tank may comprise a light nuclide fusionable isotope such as deuterium, tritium, helium-3, etc. With other gases, $N_2$, $O_2$, noble gases, etc., a high temperature gas of use in spectroscopy, light source, or the like is provided. Moreover, it will be appreciated that the disclosed procedure may be directed to the provision of a confined high temperature plasma by in situ ionization in a magnetic confinement of the character described without necessarily forming an E-layer.

As indicated previously, the principal features of this invention are applicable for injecting and trapping other charged particles as well as electrons. Generally speaking, the particles in an ion beam would be below relativistic levels so that attainable current densities are below that achievable with relativistic electrons resulting in a decreased output of Cerenkov radiation. Moreover, the ion mass is greater than that for electrons so that a smaller fraction of the energy (translational) is radiated. Accordingly, the length of the containment zone must be increased proportionally to provide effective trapping. Also, it is advisable to include stabilizing devices such as Ioffe bars to improve stability of the magnetic containment field. The mathematical expressions necessary for selection of parameters in the case of ions have been described in my paper, "Cerenkov Trapping of Current Loops in a Plasma," dated Feb. 21, 1967, and available from the Clearinghouse for Federal Scientific and Technical Information, U.S. Department of Commerce, Springfield, Va. 22151.

While a preferred embodiment of my invention has been described with particular reference to an Astron-type reactor, it should be understood that my invention is not limited to such an application. My invention may be effectively applied just as well to other families of confinement devices, for example, magnetic mirror machines.

I claim:
1. In a method for introducing and trapping energetic electrons in a magnetic field containment zone, the steps comprising:
   (a) establishing an elongated axially symmetric magnetic field in an enclosure, said magnetic field including first and second terminal regions of increased magnetic field intensity, and a third region of increased magnetic field intensity therebetween, defining first and second charged particle containment field zones, respectively, between said first and third and third and second regions of increased intensity;
   (b) directing a beam of energetic electrons tangentially at an angle to a plane perpendicular to the axis of said field to form an electron current loop in said first zone;
   (c) generating a magnetic field pulse proximate said first intensified magnetic field region to repel said electron current loop across said third intensified field region into said second containment zone; and
   (d) creating an ionized dielectric gaseous plasma in said second magnetic containment zone to interact with said energetic electron current loop to radiate energy therefrom by a Cerenkov radiative mechanism, thereby decreasing the axial translational energy component of said particles so as to trap said energetic electron current loop in said second zone to form a cylindrical sheath of energetic electrons rotating about the axis of said second containment zone.

2. The method of claim 1, wherein said plasma has a charged particle density of at least about $10^9$ particles per cubic centimeter, said electrons have an energy of above about 1 mev., and the intensity of said third region of increased intensity about 40% greater than that of said first region of increased intensity.

3. The method of claim 1, wherein said magnetic field pulse is generated by energizing a segmented solenoid disposed in proximate relation transverse to the end of said first intensified field region distal to said second zone.

4. Apparatus for injecting and trapping charged particles in a magnetic field containment zone comprising:
   (a) an elongated, generally cylindrical enclosure;
   (b) a first solenoidal coil means coaxially disposed about said enclosure for developing an axial magnetic field therethrough having first, second and third spaced intensified magnetic field regions therein with diminished intensity regions defining first and second adjacent magnetic field charged particle containment zones respectively, therebetween;
   (c) an accelerator aligned to direct an energetic beam tangentially at an angle to a plane perpendicular to the axis of said first magnetic field zone to form an electron current loop therein;
   (d) a second solenoid disposed coaxially proximate that portion of said first solenoid which develops said first intensified magnetic field region;
   (e) means for applying an electric current pulse to said solenoid to produce a magnetic field directed to repel said charged particle current loop from said first into said second magnetic field zone; and
   (f) means for creating a gaseous dielectric plasma in said second magnetic field zone, said means including at least means for providing a gas at a density in the range of about $10^{14}$ to about $10^{16}$ particles per cubic centimeter to interact with said energetic electron current loop with the emission of Cerenkov radiation ensuing, thereby diminishing axially directed translational energy from said current loop to trap said electrons in said second zone.

5. The apparatus of claim 4, wherein said solenoid is formed of a plurality of circumferentially spaced segments, and said means for applying an electrical current pulse to said solenoid includes power supplies for energizing said segments simultaneously.

6. The apparatus of claim 5, wherein said solenoid is of substantially the same diameter as said electron current loop.

7. The apparatus of claim 4, wherein said electrons have an energy of at least about 1 mev.

8. The apparatus as defined in claim 4 wherein said gas comprises a light nuclide fusionable isotope.

References Cited

UNITED STATES PATENTS

| | | | |
|---|---|---|---|
| 3,036,963 | 5/1962 | Christofilos | 176—4 |
| 3,039,014 | 6/1962 | Chang | 176—4 |
| 3,071,525 | 1/1963 | Christofilos | 176—4 |
| 3,166,477 | 1/1965 | Leboutet | 176—5 |
| 3,170,841 | 2/1965 | Post | 176—5 |
| 3,218,235 | 11/1965 | Ehler | 176—4 |
| 3,324,316 | 6/1967 | Cann | 176—4 |

REUBEN EPSTEIN, Primary Examiner

U.S. Cl. X.R.

313—161; 315—111